(12) United States Patent
Lu et al.

(10) Patent No.: US 7,382,367 B1
(45) Date of Patent: Jun. 3, 2008

(54) METHOD AND SYSTEM FOR TRANSFERRING STATE VARIABLES IN ADAPTIVE MESH-FREE ANALYSIS

(75) Inventors: Hongsheng Lu, Livermore, CA (US); Cheng-Tang Wu, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 143 days.

(21) Appl. No.: 11/383,135

(22) Filed: May 12, 2006

Related U.S. Application Data

(63) Continuation-in-part of application No. 11/351,794, filed on Feb. 10, 2006.

(51) Int. Cl.
G06T 17/20 (2006.01)
(52) U.S. Cl. ............ 345/420; 345/419; 345/421; 345/423; 703/2
(58) Field of Classification Search ........... 345/419, 345/420, 421, 423; 703/2
See application file for complete search history.

(56) References Cited

U.S. PATENT DOCUMENTS 6,718,291 B1 * 4/2004 Shapiro et al. ............... 703/2

* cited by examiner

*Primary Examiner*—Kimbinh T Nguyen
(74) *Attorney, Agent, or Firm*—Roger H. Chu

(57) ABSTRACT

A method and system for transferring state variables between an old and new model in an adaptive mesh-free analysis is described. The old and the new model are associated with a set of old and new integration points, respectively. A third set of nodes is formed to include old boundary nodes and the set of old integration points. For each of the new integration points, a sub-set of the third set is defined. The support of each node of the sub-set covers the new integration point to be evaluated. A local interpolant with a desirable consistency condition and interpolation properties is constructed to interpolate state variables at the new integration points. All of the non-interpolated approximation can be transformed into the interpolated approximation with the desired consistency condition and smoothness using this procedure.

20 Claims, 13 Drawing Sheets

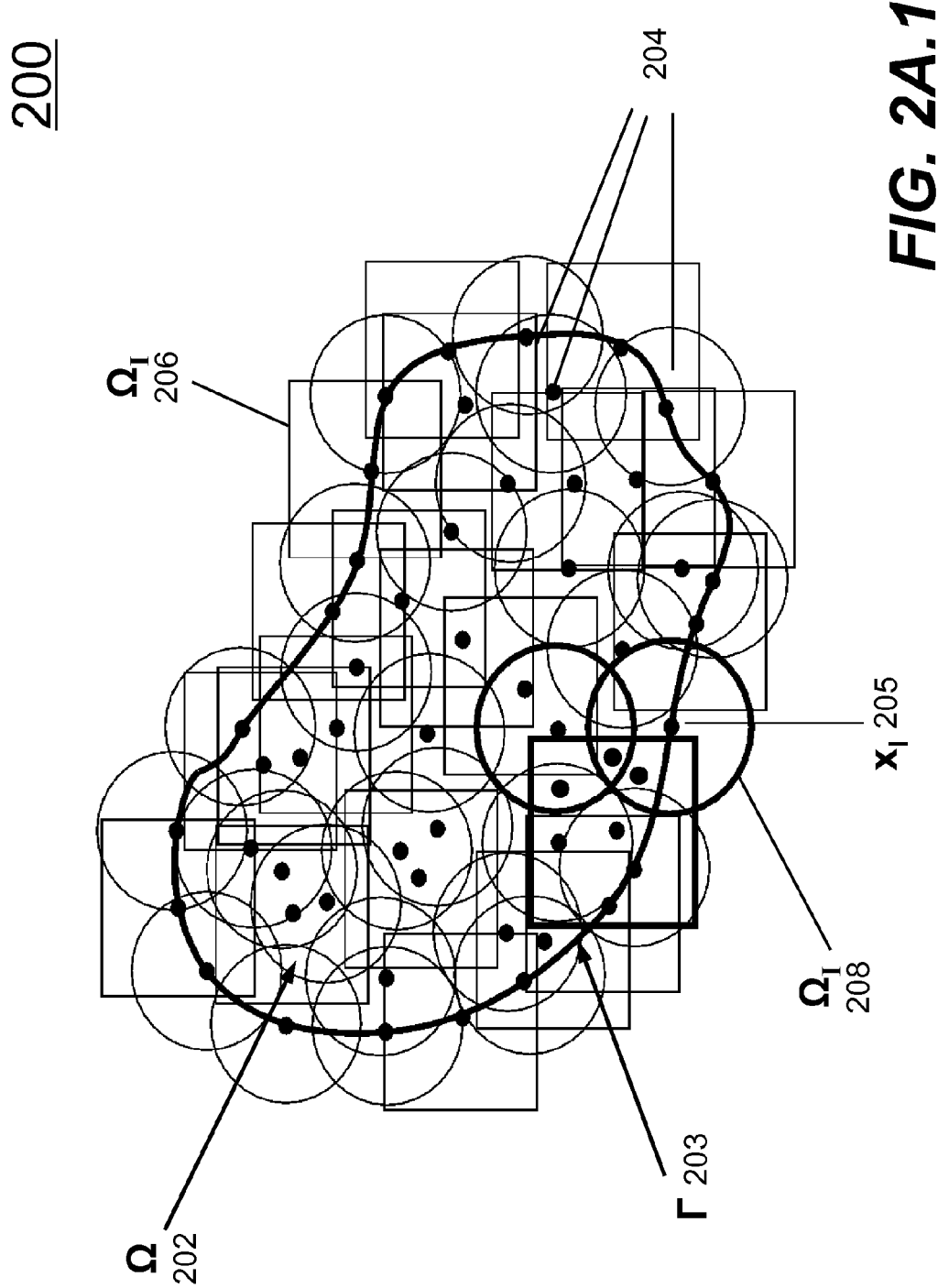
FIG. 2A.1

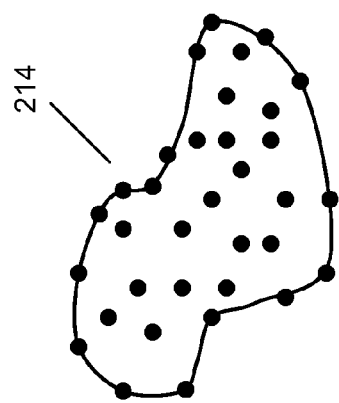
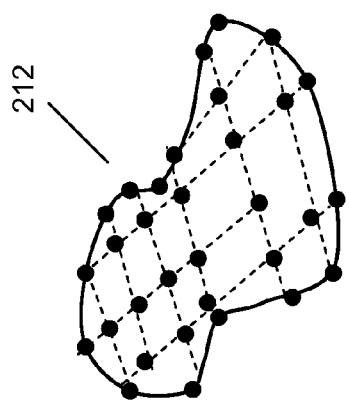
FIG. 2A.2
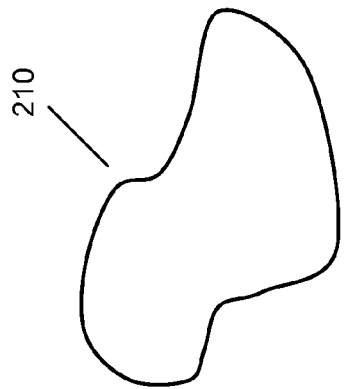
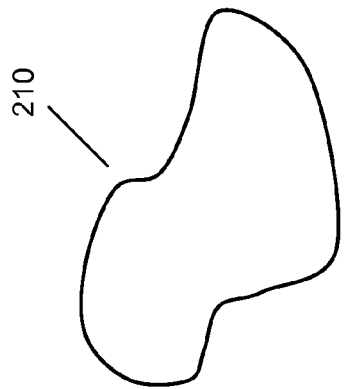
FIG. 2A.3

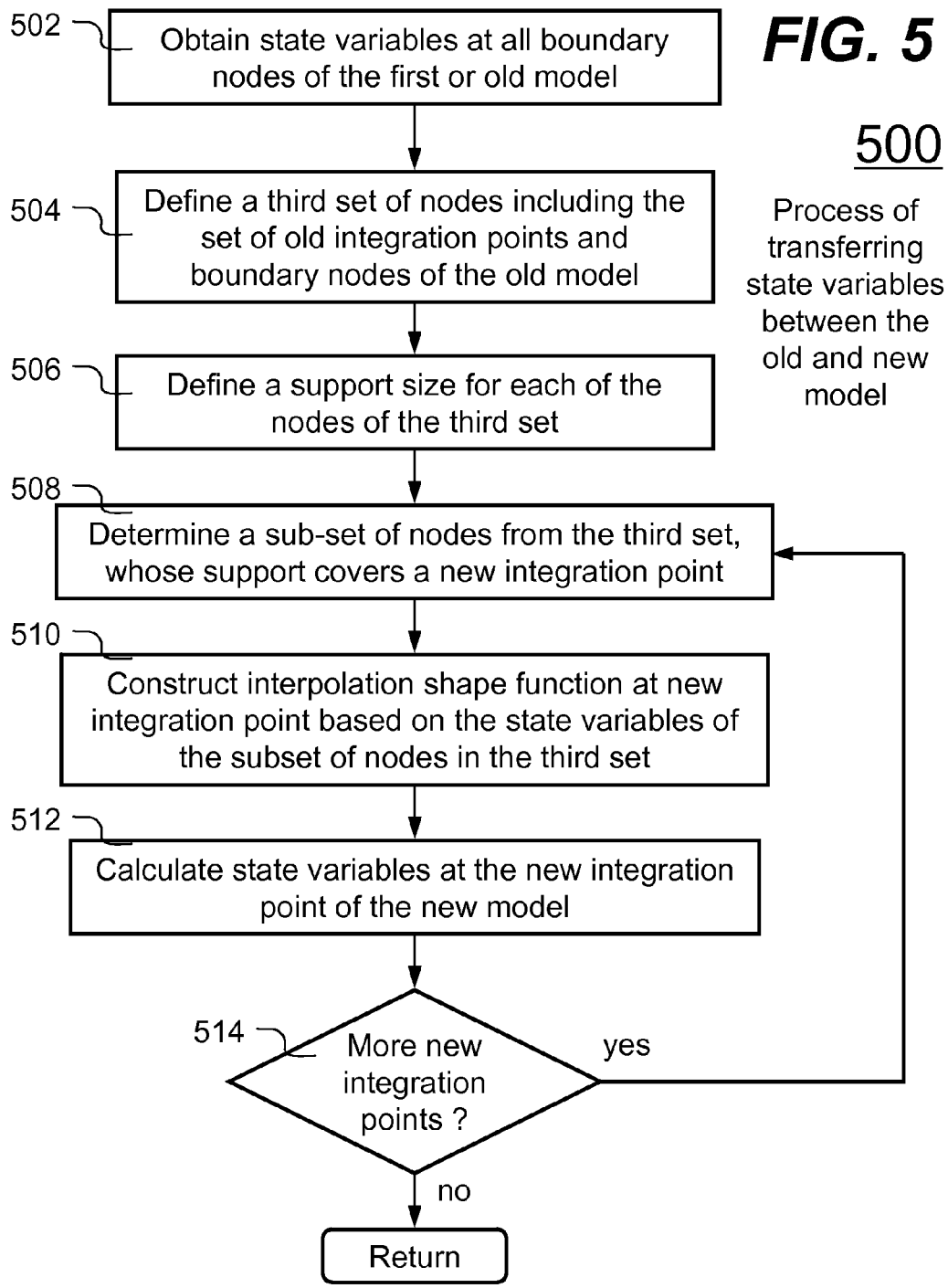

METHOD AND SYSTEM FOR TRANSFERRING STATE VARIABLES IN ADAPTIVE MESH-FREE ANALYSIS

BACKGROUND

1. Field of the Invention

The present invention generally relates to the area of computer aided engineering analysis, more particularly to method and system for transferring state variables between an old and a new model in an adaptive mesh-free analysis.

2. Description of the Related Art

Finite element analysis (FEA) is a computerized method widely used in industry to model and solve engineering problems relating to complex systems since its invention in late 1950's. With the advent of the modern digital computer, FEA has been implemented as FEA computer program product. Basically, the FEA computer program product is provided with a model of the geometric description and the associated material properties at certain points within the model. In this model, the geometry of the system under analysis is represented by solids, shells and beams of various sizes, which are called elements. The vertices of the elements are referred to as nodes. The individual elements are connected together by a topological map, which is usually called mesh. The model is comprised of a finite number of elements, which are assigned a material name to associate with material properties. The model thus represents the physical space occupied by the object under analysis along with its immediate surroundings.

Although FEA has been successfully applied to many fields to simulate various engineering problems, there are some instances that FEA may not be advantageous due to numerical compatibility condition is not the same as the physical compatibility condition of a continuum. For example, in Lagrangian type of computations, one may experience mesh distortion, which can either end the simulation prematurely or result in drastic deterioration of accuracy. In addition, the FEA often requires a very fine mesh in problems with high gradients or a distinct local character, which can be computationally expensive. For this reason, adaptive FEA has been developed to allow the FEA mesh be regenerated after certain number of solution cycles, such that the original mesh can be refined in the region experiencing high distortion.

Adaptive re-meshing procedures for simulations of impact/penetration problems, explosion/fragmentation problems, flow pass obstacles, and fluid-structure interaction problems etc., have become formidable tasks to undertake. The difficulties here are not only re-meshing procedure, but also mapping the values of state variables from the old model to the new model. Many ad hoc techniques such as smoothing have used for the process of transferring state variables. The problem associated with these ad hoc techniques is that the accuracy and convergence properties can not be preserved from one mesh or model to the next. As a result, inconsistent analysis results are produced.

Another method called "mesh-free analysis" has become one of the focused research topics during the 1990's. Many applications of using mesh-free analysis have been achieved in the past decade. In comparison with conventional finite element methods, the characteristics of smoothness and naturally conforming of the approximation, exemption from meshing, and higher convergence rate and the easy of nodal insertion and deletion have make mesh-free methods attractive alternative numerical techniques for nonlinear analysis of industrial applications. In a highly non-linear structural analysis, a mesh-free model can be regenerated after the error indicator exceeds a pre-determined level. Since there is no mesh, the generation of a new model is relatively easier comparing to that of the finite element analysis. Similar to the finite element analysis, the state variables need to be transferred between the old and the new models with preservation of accuracy and convergence properties. Therefore, it would be desirable to have a consistent means to transferring state variables between an old and a new model in an adaptive mesh-free analysis.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

A method and system for transferring state variables between an old or first model and a new or second model in an adaptive mesh-free analysis is disclosed. The old model is defined by a first set of nodes representing a domain (e.g., a structure, a building, a vehicle, an airplane, a train, etc.). The new model is defined by a second set of nodes representing the same domain after an adaptive process. In addition, a set of old and a set of new integration points are defined in the first and second models, respectively. In one embodiment, the first and second models are associated with a background mesh, which may be used for defining the integration points. In order to transfer state variables between the new and the old integration points, a third set of nodes is formed to include old boundary nodes and the set of old integration points. The old boundary nodes are those of the first set of nodes located at the boundary of the domain. First, the values of state variables (e.g., stress, strain, etc.) of the old boundary nodes are obtained from the state variables of the old integration points or directly calculated. Then, each node in the sub-set is assigned a support or domain of influence (e.g., a circle, a sphere). For each of the new integration points to be evaluated, a sub-set of the third set of nodes is defined. Only those nodes in the third set whose support covers the new integration point are included in the sub-set. As a result, the number of nodes in each of the sub-sets is substantially smaller than the number of nodes in the third set. Therefore the computation of state variables of the new integration points can be more efficient. The procedure of the computation is carried out as follows: a local interpolant, which preserves a desirable consistency condition and owns interpolation properties, is constructed based on the old integration points and the boundary points; the state variables at each of the new integration points are obtained by interpolating from the sub-set of nodes that covers the new integration point to be evaluated. All of the other non-interpolated approximation can be transformed into the interpolated approximation with the desired consistency condition and smoothness by this procedure.

The present invention may be implemented in software, hardware, or a combination of both as a method, a process, a system or a software product. According to one embodiment, the present invention is a method for simulating a domain using adaptive mesh-free analysis with consistent state variables transfer. The method comprises at least the following: (a) defining a first set of nodes as an old model representing the domain, wherein the first set of nodes includes a group of boundary nodes; (b) updating current solution time; (c) performing mesh-free approximation of the first set of nodes at the current solution time; (d) when adaptivity is required, computer readable code for defining a second set of nodes as a new model representing the domain, wherein the second set of nodes are adapted from the first set of nodes; (e) transferring old state variables of the old model to new state variables of the new model; and (f) when the current solution time is less than a predefined total simulation time, setting the new model as the old model and repeating (b) to (f).

One of the objects, features, and advantages of the present invention is to ensure that the state variables are transferred in a consistent means between an old and a new model without relying upon inconsistent ad hoc procedures in either an adaptive mesh-free analysis.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be become better understood with regard to the following description, appended claims, and accompanying drawings where:

FIG. 2A.1 shows an exemplary mesh-free analysis model in accordance with one embodiment of the present invention;

FIGS. 2A.2 and 2A.3 show an exemplary mesh-free analysis model with and without background mesh in accordance with one embodiment of the present invention;

FIG. 5 shows a flowchart or process for transferring state variables between an old and a new model in an adaptive mesh-free analysis in accordance with one embodiment of the present invention.

DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention does not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

FEM stands for Finite Element Method, which is used interchangeably with FEA hereinafter.

Essential boundary condition is defined such as the structural constraints on a model.

Mesh-free model refers to a plurality of nodes representing a domain to be analyzed.

Background mesh refers to a mesh (e.g., finite element mesh) representing the domain.

Boundary nodes are referred to the nodes located at the boundary of a model.

Boundary and border are used interchangeably hereinafter.

Domain of influence and support of a node in the mesh-free model are used interchangeably hereinafter.

Computer, computer system, and computing device are used interchangeably hereinafter.

Embodiments of the present invention are discussed herein with reference to FIGS. 1A-5. However, those skilled in the art will readily appreciate that the detailed description given herein with respect to these figures is for explanatory purposes as the invention extends beyond these limited embodiments.

Figure 1A:
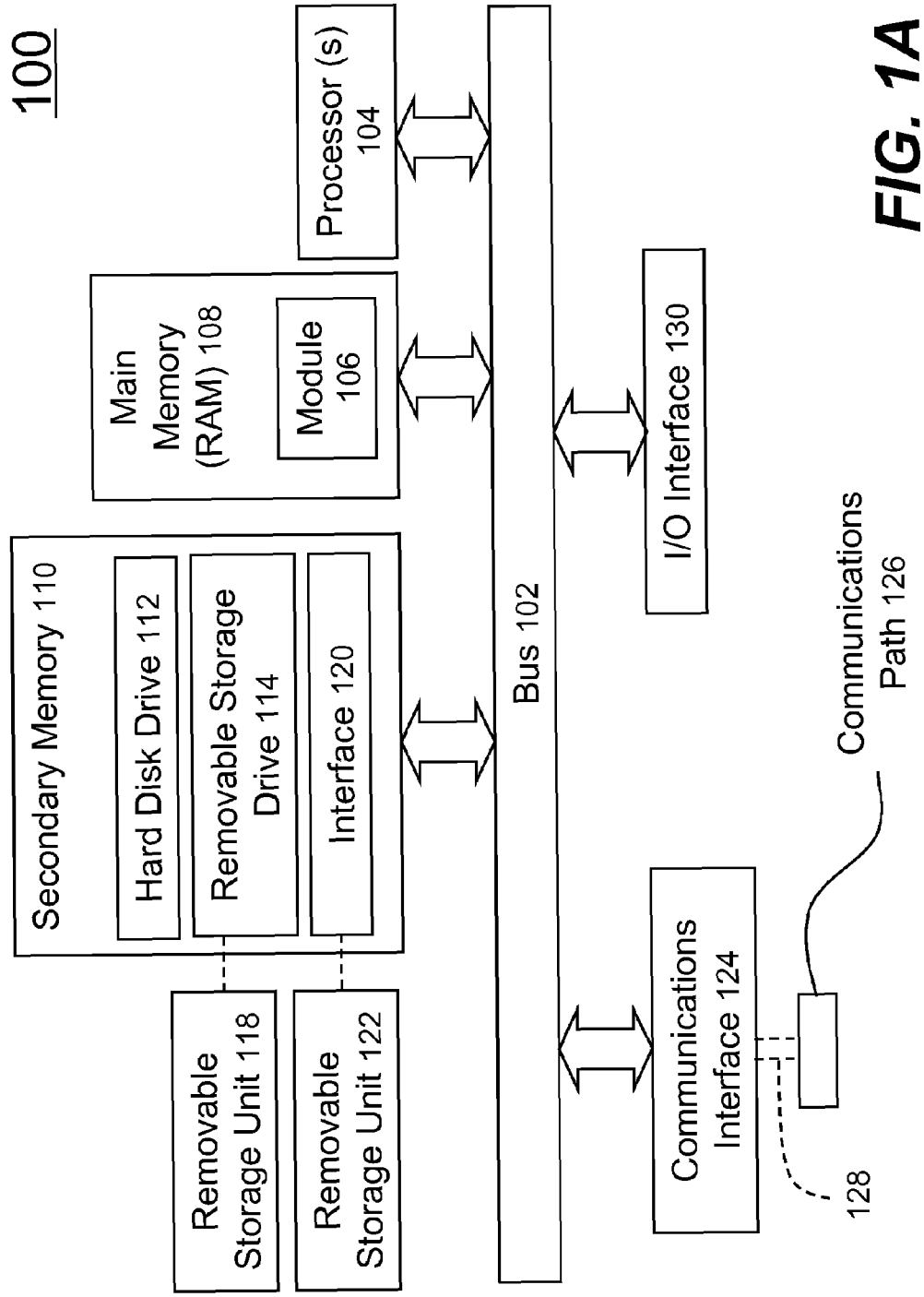
FIG. 1A depicts a block diagram of an exemplary computer, in which one embodiment of the present invention may be implemented.

Referring now to the drawings, in which like numerals refer to like parts throughout several views. The present invention may be implemented using hardware, software or a combination thereof and may be implemented in a computer system or other processing system. In fact, in one embodiment, the invention is directed toward one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link and other communications channels.

The channel 126 facilitates a data flow 128 between a data network (e.g. 150 in FIG. 1B) and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112. These computer program products are means for providing software to computer system 100. The invention is directed to such computer program products.

The computer system 100 may also include an I/O interface 130, which provides the computer system 100 to access monitor, keyboard, mouse, printer, scanner, plotter, and a like.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by at least one processor 104 with or without a user input through the I/O interface 130 to achieve desired tasks. In one embodiment, the application module 106 is configured to facilitate the creation of a set of nodes as a model representing a domain. In another embodiment, the application module 106 is configured to facilitate the computation of mesh-free approximation of a set of nodes. In yet another embodiment, the application module 106 is configured to facilitate the adaptive process such as checking the error indicator, invoking the creation of another model, transferring state variables between two subsequent models. In still yet another embodiment, the application module 106 is configured to facilitate the storage of the computation results in a secondary memory 110 (i.e., hard disk). The status of the simulation (e.g., the progress of a structural analysis) is reported to the user via the I/O interface 130. The current state of the domain to be analyzed may be shown graphically for visual inspection. The graphical output is sent through the I/O interface 130 to a monitor.

Figure 1B:
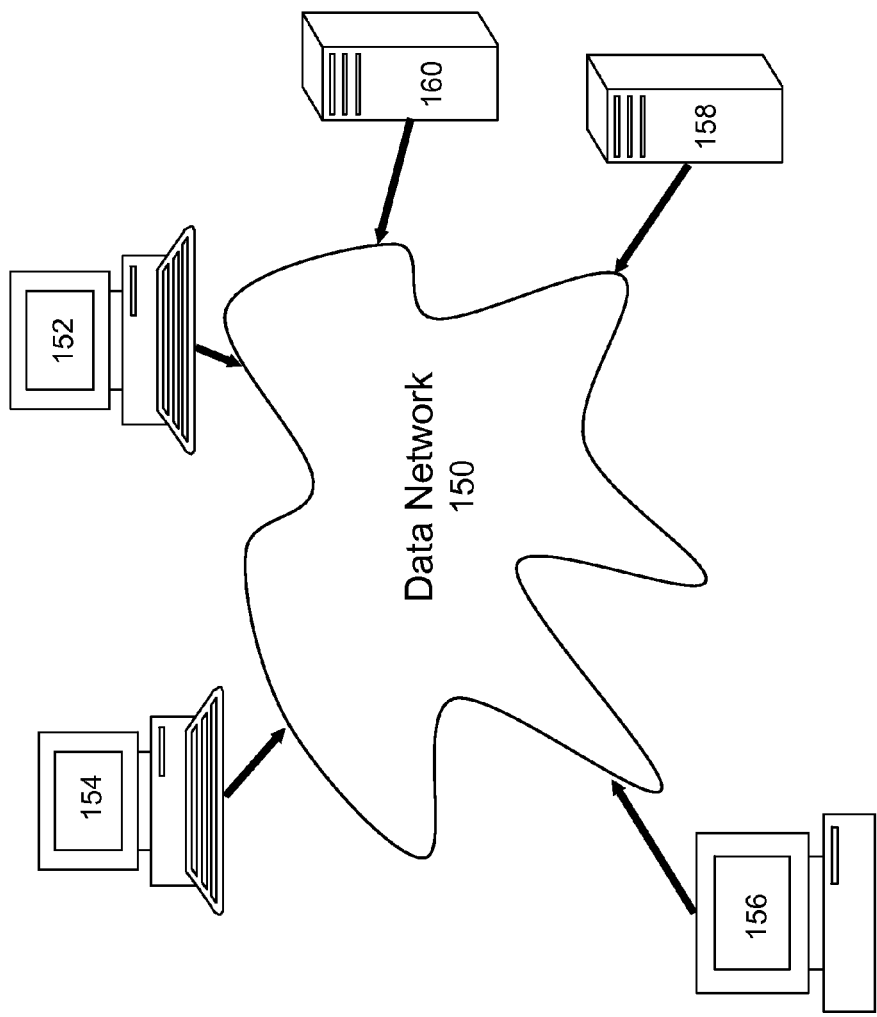
FIG. 1B depicts an exemplary network environment that one embodiment of the present invention may be implemented.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, the application module (i.e., 106 in FIG. 1A) for an adaptive mesh-free analysis is configured and executed on a computing device 156. The user prepares the input file using a pre-processing software module also located on the device 156. And the analysis is performed and the output of the analysis is fed to a post-processing module to present the results either in numerical or graphical form. In another embodiment, the application module for an adaptive mesh-free analysis is configured and executed on the computing device 160. A user may prepare an input file describing the physical domain of a structure on a personal workstation computing device 152. The input file is then sent to the computing device 160 via the network 150 to facilitate the computation of mesh-free analysis. During the execution of the application module, the user may be able to monitor the progress of the analysis at another computing device 156. Finally after the analysis is completed, the user may examine the computed results by retrieving the stored result file from the computer 160 to any one of the computing devices 152, 154 or 156 for a post-processing, which in general includes a graphical representation of the analysis results. One exemplary implementation of this technique is included in a suite of engineering analysis computer software products, LS-PREPOST® and LS-DYNA®, offered by Livermore Software Technology Corporation.

FIG. 2A.1 illustrates an exemplary mesh-free model 200 in accordance with one embodiment of the present invention. An exemplary physical domain (e.g., a structure, a vehicle, an airplane, a train) Ω 202 and the corresponding boundary or border Γ 203 are depicted in FIG. 2A.1. To represent the physical domain 202, a plurality of nodes 204 are used. The nodes representing the physical domain do not have a particular pattern. They may be regularly spaced or in random locations. These nodes may be located in the interior or on the boundary of the physical domain. Each of the nodes 204 contains a domain of influence or support $Q_I$ 206 or 208. The domain of influence and the support are used interchangeably hereinafter. The size and shape of the support for each node are also arbitrary. In one embodiment, the shape of the support is quadrilateral 206. In another embodiment, the shape is circular 208. In the case of three-dimensional support, the shape of the support may be spherical in that embodiment. In yet another embodiment, the size and the shape of each node are different. One node may have a one square foot support while another node may have a 16-in radius circular support in the same model. In yet another embodiment, the support is not a regular geometric shape. It can be any arbitrary shape. The present invention can support all different combinations. To simplify the illustration, the exemplary domain 202 is a two-dimensional domain. The present invention applies in a three-dimensional (3-D) domain as well. A typical support in a 3-D domain has a spherical shape. The shape of the support is not limited to any shape. For example other shapes such as cube can also be used.

According to one embodiment, because of the flexibility of the present invention regarding the nodal representation 204 of the physical domain 202, a practical way to create a computer model for the mesh-free analysis is to use the FEA nodal data that is readily generated from a pre-processing software module. The pre-processing software module may be a stand-alone software package or a built-in portion of an engineering design or analysis computer program product package. The FEA mesh can be used as the background mesh for the mesh-free analysis. Integration points (i.e., Guass points) for each element defined in the FEA model are inherited in the mesh-fee analysis. In another embodiment, the background mesh is created by connecting a set of nodes in a mesh-free model that is not related to any FEA model at all. Similarly, integration points for a mesh-free model are related to a pre-determined integration scheme and have no relationship with integration points used in a FEA model.

One embodiment of the present invention can be carried out in an adaptive mesh-free analysis. The mathematical theory of the mesh-free analysis is summarized as follows: the mesh-free analysis with the discrete Moving Least-Squared (MLS) approximation of a function u(x), denoted by $u^h(x)$, is constructed by a combination of the monomials as $$u^h(x) = \sum_{i=1}^{n} H_i(x)b_i(x) \equiv H^T(x)b(x) \tag{1}$$

where n is the order of completeness in this approximation, the monomial $H_i(x)$ are basis functions, and $b_i(x)$ are the coefficients of the approximation. The coefficients $b_i(x)$ at any point x are depending on the sampling points $x_1$ that are collected by a weighting function $w_a(x-x_1)$. This weighting function is defined to have a compact support measured by 'a', i.e., the sub-domain over which it is nonzero is small relative to the rest of the domain. Each sub-domain $\Omega_I$ 208 is associated with a node $x_I$. The most commonly used sub-domains are blocks 206 or disks 208 in 2-D as shown in FIG. 2A.1. In this embodiment, the cubic B-spline kernel function is chosen as the weighting function:

$$w_a(x-x_I) = \begin{cases} \frac{2}{3} - 4\left(\frac{\|x-x_I\|}{a}\right)^2 + 4\left(\frac{\|x-x_I\|}{a}\right)^3 & \text{for } 0 \leq \frac{\|x-x_I\|}{a} \leq \frac{1}{2} \\ \frac{4}{3} - 4\left(\frac{\|x-x_I\|}{a}\right) + 4\left(\frac{\|x-x_I\|}{a}\right)^2 - \\ \frac{4}{3}\left(\frac{\|x-x_I\|}{a}\right)^2 & \text{for } \frac{1}{2} < \frac{\|x-x_I\|}{a} \leq 1 \\ 0 & \text{otherwise} \end{cases} \tag{2}$$

The moving least-squares technique consists in minimizing the weighted $L_2$-Norm as follows:

$$J = \sum_{I=1}^{NP} w_a(x-x_I)\left[\sum_{i=1}^{n} H_i(x)b_i(x) - u(x_I)\right]^2 \tag{3}$$

where NP is the number of nodes within the support of x for which the weighting function $w_a(x-x_1) \neq 0$. Equation (3) can then be written in the form $$J = (Hb-u)^T W_a(x)(Hb-u) \tag{4}$$

where $$u^T = (u_1, u_2, \ldots u_{NP}) \tag{5}$$

$$H = \begin{bmatrix} \{H(x_1)\}^T \\ \ldots \\ \{H(x_{NP})\}^T \end{bmatrix} \tag{6}$$

$$\{H(x_i)\}^T = \{H_1(x_i), \ldots H_n(x_i)\} \quad (7)$$

$$W_a = \text{diag}[w_a(x-x_1), \ldots, w_a(x-x_{NP})] \quad (8)$$

To find the coefficients b, the extreme value of J can be solved by setting the derivative to zero:

$$\partial J/\partial b = M^{[n]}(x)b(x) - B(x) - B(x)u = 0 \quad (9)$$

where $M^{[n]}(x)$ is called the moment matrix of $w_a(x-x_1)$ and is given by $$M^{[n]}(x) = H^T W_a(x) H \quad (10)$$

$$B(x) = H^T W_a(x) \quad (11)$$

Thus $$b(x) = M^{[n]-1}(x) B(x) u \quad (12)$$

For $M^{[n]}(x)$ to be invertible, the support of $w_a(x-x_1)$ needs to be greater than a minimum size that is related to the order of basis functions. Using the solution of Equations (1), (10), (11) and (12), the approximation is obtained by $$u^h(x) = \sum_{I=1}^{NP} \Psi_I(x) u_I \quad (13)$$

where the shape functions $\Psi_I(x)$ are given by $$\Psi_I(x) = H^T(x) M^{[n]-1}(x) B(x) \quad (14)$$

and $\Psi_I(x)$ are nth-order complete as indicated below:

$$\sum_{I=1}^{NP} \Psi_I(x) x_{1I}^p x_{2I}^q x_{3I}^r = x_1^p x_2^q x_3^r \text{ for } p+q+r = 0, \ldots n \quad (15)$$

In general, mesh-free shape functions $\Psi_I(x)$ do not possess Kronecker delta properties indicated by the values 222 not equal to 1.0, $$\Psi_I(x_J) \neq \delta_{IJ} \quad (16)$$

This means that the coefficients of the interpolant are not the same as the nodal value.

$$u^h(x_I) \neq u_I \quad (17)$$

Figure 2B:
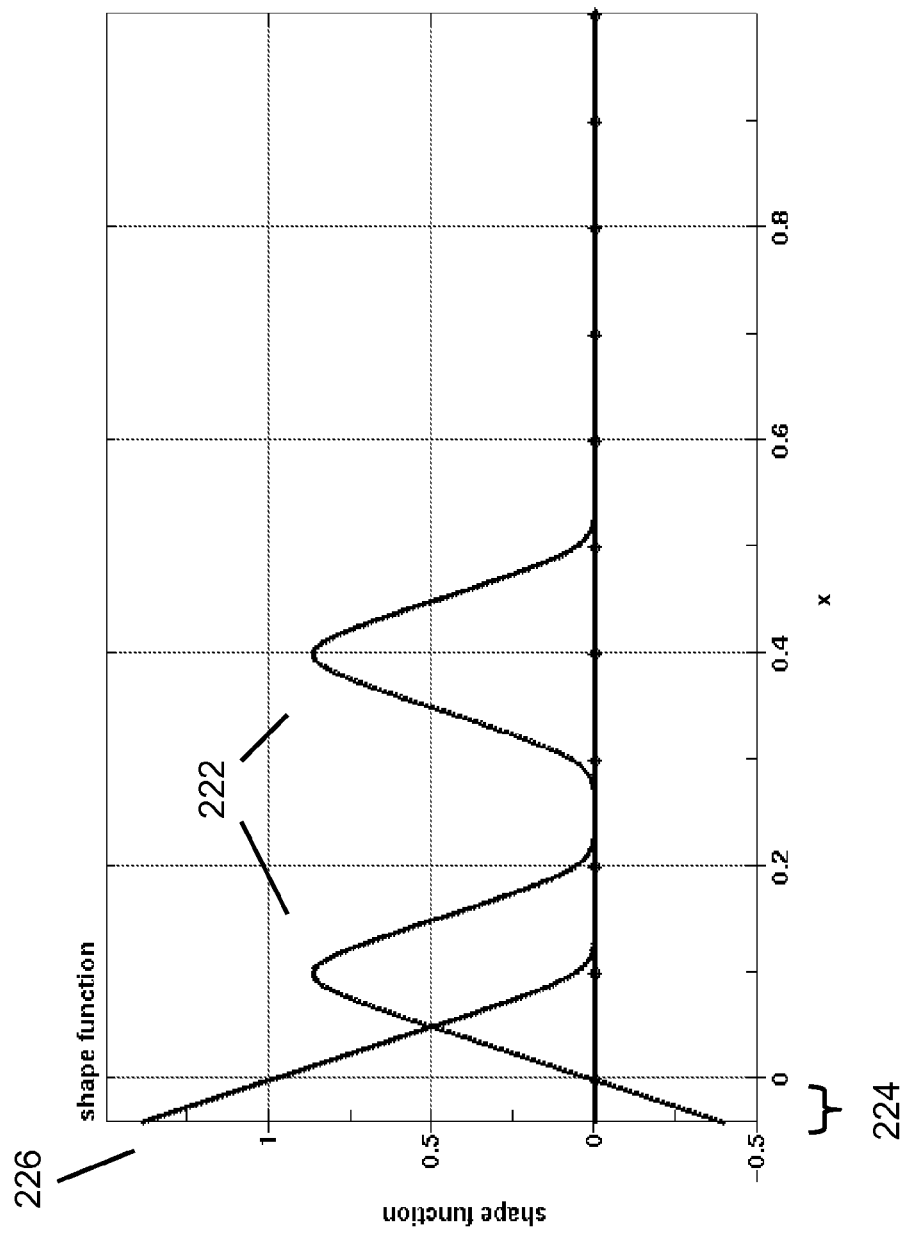
FIG. 2B shows a diagram of exemplary shape functions at nodes in accordance with one embodiment of the present invention.

The mesh-free shape functions 220 defined in Equation (14) are smoothed but not the monomial functions as shown in FIG. 2B. Although the consistency condition is still satisfied, the magnitude 226 of shape function outside 224 the domain changes dramatically which is mainly dependent on the support size and the nodal distribution near the boundary. The non-linearity of the shape functions tends to increase as the nodal distribution becomes irregular. Based on the consistency condition in Equation (15), the interpolation estimate for mesh-free approximation is given as: assume a continuous function $u \in H^{n+1}(\Omega)$ and a smooth weighting function $w_a \in C^S(\Omega)$ with $s > n+1$ $$\|u - u^h(x)\|_{L^2(\Omega)} \leq C a^{n+1} \|u\|_{N^{n+1}(\Omega)} \quad (18)$$

where C is a constant, which is independent with the support size a.

As mentioned in the previous section, the mesh-free shape function does not own interpolation property as shown in Equations (16) and (17). To overcome this, a new interpolant that preserves consistency condition as well as interpolation property is constructed with the following mathematical procedure. The mesh-free approximation is written as:

$$u^h = \sum_{I=1}^{NP} \Psi_I(x) \hat{u}_I \quad (19)$$

The approximation at node J reads $$u_J^h = \sum_{I=1}^{NP_J} \Psi_I(x_J) \hat{u}_I = \sum_{I=1}^{NP_J} T'_{IJ} \hat{u}_I \quad (20)$$

where $\hat{u}_I$ are the coefficients of the mesh-free approximation at node I, and $NP_J$ is the number of nodes whose shape function covers the node J $$T'_{IJ} = \Psi_I(x_J) \quad (21)$$

The matrix form of Equation (19) is $$u^h = T\hat{u}, T = [T_{IJ}] = [T_{JI}'], T^{-1} = [T_{IJ}^{-1}] = [T_{JI}'^{-1}] \quad (22)$$

$$\hat{u} = (\hat{u}_1, \hat{u}_2, \ldots \hat{u}_{NP})^T, u^h = (u_1^h, u_2^h, \ldots u_{NP}^h)^T \quad (23)$$

Where T is a transforming matrix.

$$\hat{u}_I = \sum_{J=1}^{NP} T_{JI}'^{-1} u_J^h \quad (24)$$

By substituting Equation (24) into Equation (19), $$u^h(x) = \sum_{I=1}^{NP} \Psi_I(x) \hat{u}_I = \sum_{I=1}^{NP} \Psi_I(x) \sum_{J=1}^{NP} T_{JI}'^{-1} u_J^h = \sum_{J=1}^{NP} \hat{\Psi}_J(x) u_J^h \quad (25)$$

where $$\hat{\Psi}_J(x) = \sum_{I=1}^{NP} T_{JI}'^{-1} \Psi_I(x) \quad (26)$$

The new approximation is written as $$u^h(x) = \sum_{I=1}^{NP} \hat{\Psi}_I(x) u_I \quad (27)$$

Figure 2C:
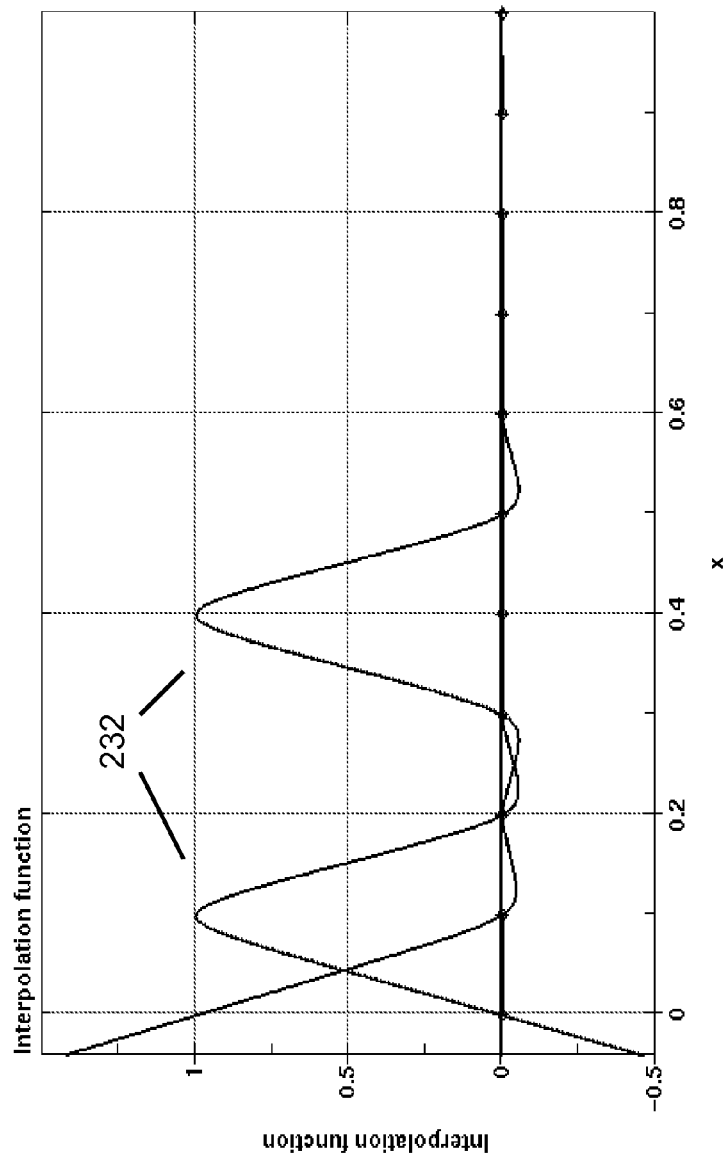
FIG. 2C shows a diagram of exemplary interpolation functions at nodes in accordance with one embodiment of the present invention.

$\hat{\Psi}_J(x)$ is referred to as the new interpolant function 230 at node J, which is compacted and whose influence becomes wide comparing to the original approximation as shown in FIG. 2C. It is straightforward to show that the new approximation owns the interpolation property (i.e., Kronecker delta property) 232 and keeps the same consistency condition as the mesh-free approximation.

$$\hat{\Psi}_I(x_J) = \sum_{K=1}^{NP} T_{IK}'^{-1} \Psi_K(x_J) = \sum_{K=1}^{NP} T_{IK}'^{-1} T_{KJ}' = \delta_{IJ} \qquad (28)$$

The consistency condition of the mesh-free approximation at node J reads $$\sum_{I=1}^{NP} \Psi_I(x_J) \hat{u}_I = \sum_{I=1}^{NP} \Psi_I(x_J) x_{1I}^p x_{2I}^q x_{3I}^r \qquad (29)$$
$$= x_{1J}^p x_{2J}^q x_{3J}^r = u_J^h \text{ for } p+q+r = 0, \ldots n$$

From Equations (15) and (25)

$$\sum_{I=1}^{NP} \Psi_I(x) \hat{u}_I = \sum_{I=1}^{NP} \Psi_I(x) x_{1I}^p x_{2I}^q x_{3I}^r = x_1^p x_2^q x_3^r \qquad (30)$$
$$= \sum_{J=1}^{NP} \hat{\Psi}_J(x) u_J^h \text{ for } p+q+r = 0, \ldots n$$

Substitute Equation (29) into Equation (30), the new consistency condition for the new interpolation can be written as:

$$u^h = \sum_{J=1}^{NP} \hat{\Psi}_J(x) u_J^h = \sum_{J=1}^{NP} \hat{\Psi}_J(x) x_{1J}^p x_{2J}^q x_{3J}^r \qquad (31)$$
$$= x_1^p x_2^q x_3^r \text{ for } p+q+r = 0, \ldots n$$

Similarly, the smoothness of the new interpolation function is the same as the original mesh-free shape function, which can be a $C^\infty(\bar{\Omega})$ function. This makes the new interpolant suitable for geometry fitting such as smooth surface fitting. The new interpolation also keeps same convergence property, if the transform matrix is well-defined which is mainly dependent on the nodal distribution and support size, a, i.e.

$$\|u - \hat{u}^h(x)\|_{L^2(\bar{\Omega})} \leq C a^{n+1} \|u\|_{H^{n+1}(\bar{\Omega})} \qquad (32)$$

The new interpolant function can be employed in the state variable transfer between subsequent models (i.e., an old model and a new model) during adaptive procedure of an adaptive mesh-free analysis. The state variables at the integration points can be directly transferred between old integration points in the old model and the new integration points in the new model. As shown in Equation (24), there is an inverse operation of transforming matrix T in the construction of new interpolant. This transformation is expensive in term of computation time especially for the large scale problem. Instead of choosing all of the old integration points to perform the transformation, the transformation includes only a plurality of local sub-set of old integration points. The criterion for the sub-set is determined as follows: the support of the old integration points in each of the sub-set covers a new integration point to be evaluated. The interpolant used in the sub-set is called a local interpolant. The detailed descriptions are described in FIGS. 3A-3C.

In accordance with one embodiment of the present invention, an exemplary mesh-free analysis model with background mesh 212 represents a domain 210 is shown in FIG. 2A.2. Another mesh-free analysis model without background mesh 214 represents the same domain 210 in FIG. 2A.3.

Figure 2D:
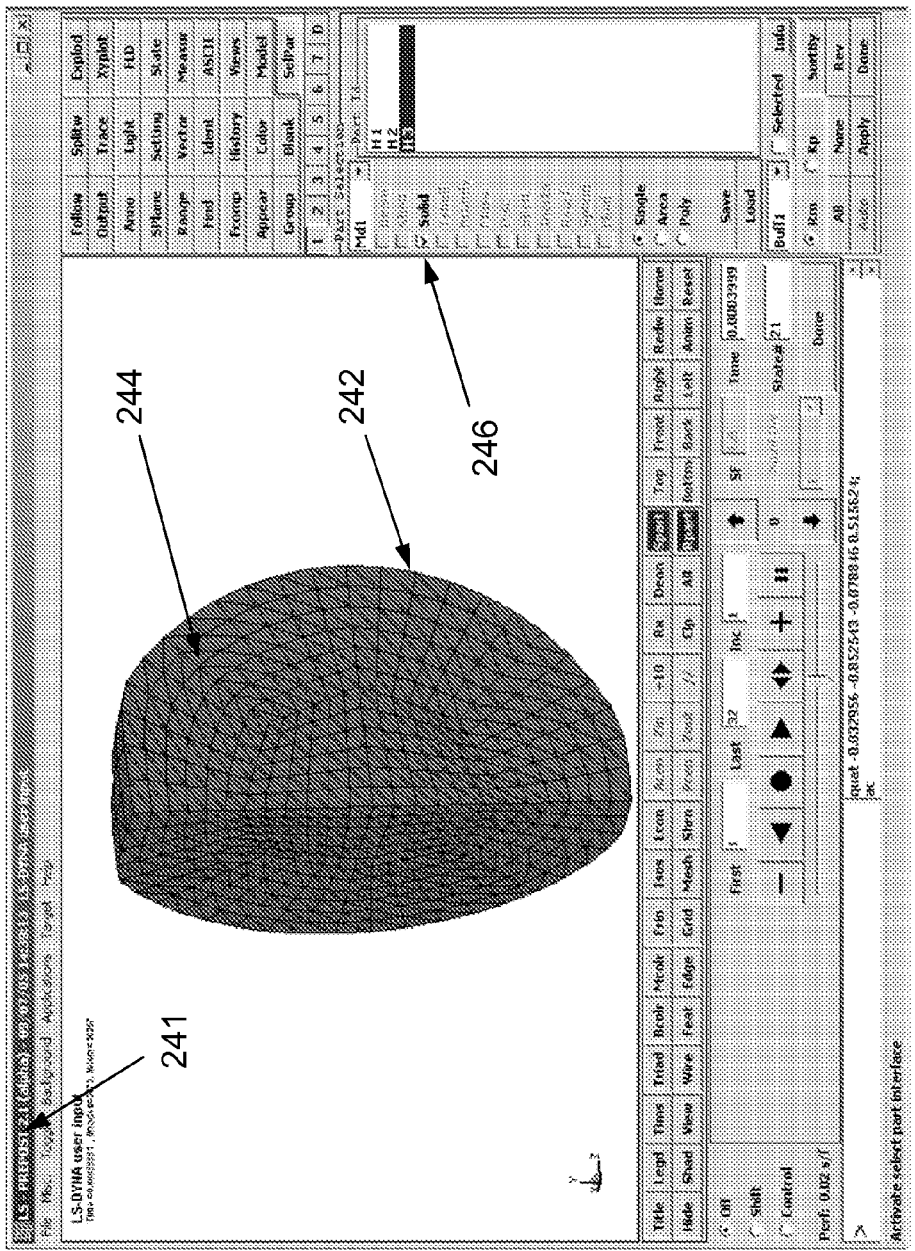
FIG. 2D shows a user interface for displaying an exemplary background mesh of an old model of a domain before an adaptive process in accordance with one embodiment of the present invention.

FIG. 2D shows a user interface 240 for displaying an exemplary background mesh of an old model of a domain before an adaptive process in accordance with one embodiment of the present invention. The user interface 240 of a software module called "LS-PREPOST" as indicated in the title bar 241 shows a background mesh 244 of an old or first model of a domain 242 just before an adaptive process. The mesh 244 of the old model is made of tetrahedra. It is indicated in the user interface that these tetrahedra are solid elements 246.

Figure 2E:
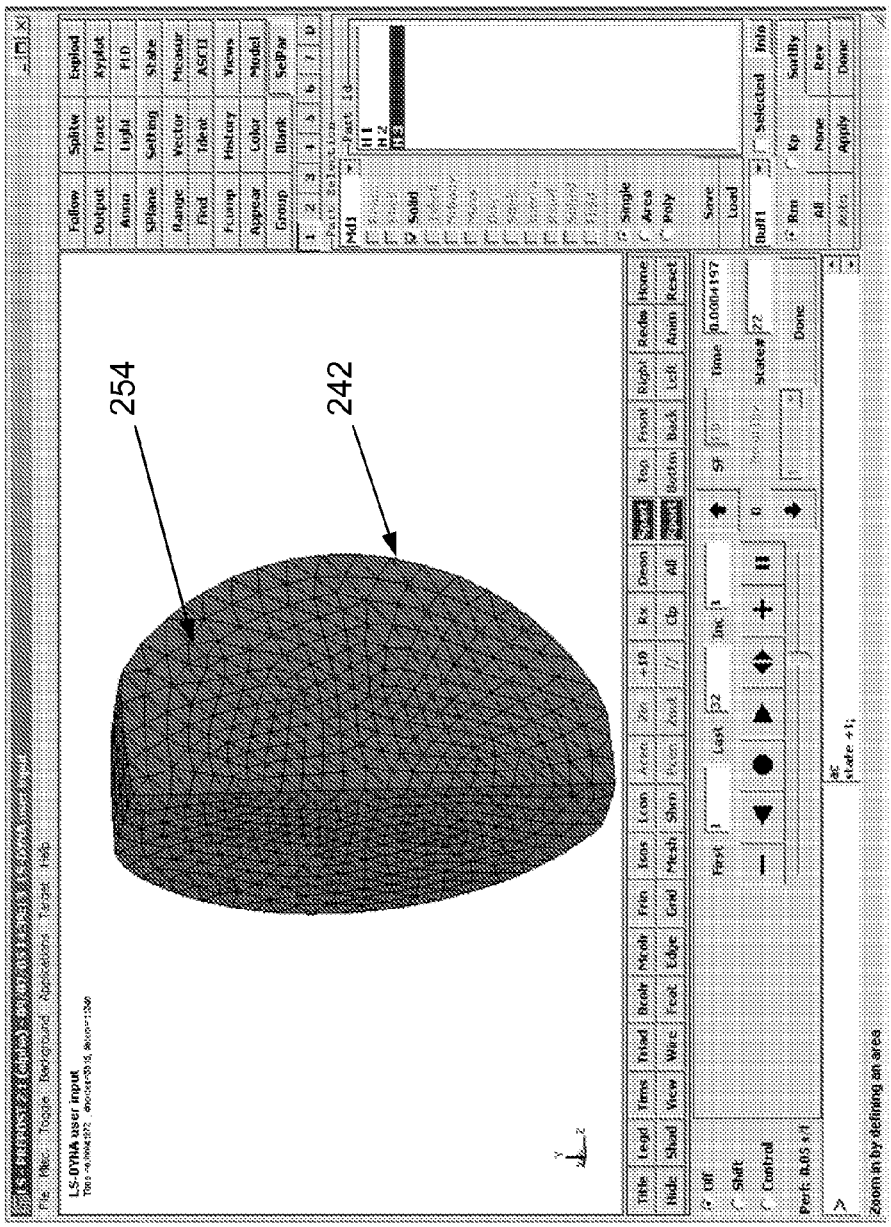
FIG. 2E shows a user interface for displaying an exemplary background mesh of a new model of the same domain of FIG. 2D after the adaptive process in accordance with one embodiment of the present invention.

FIG. 2E shows a user interface 250 for displaying an exemplary background mesh of a new model of the same domain of FIG. 2D after the adaptive process in accordance with one embodiment of the present invention. The user interface 250 of "LS-PREPOST" shows a background mesh 254 of a new or second model of the same domain 242 right after the adaptive process. It is evident that the new mesh 254 is different comparing to the old mesh 244. The adaptive process generates additional nodes at the locations that require more refinement. According to one aspect of the present invention, the state variables are transferred from the old integration points of the old model to the new integration points of the new model using a local interpolant.

Figure 3A:
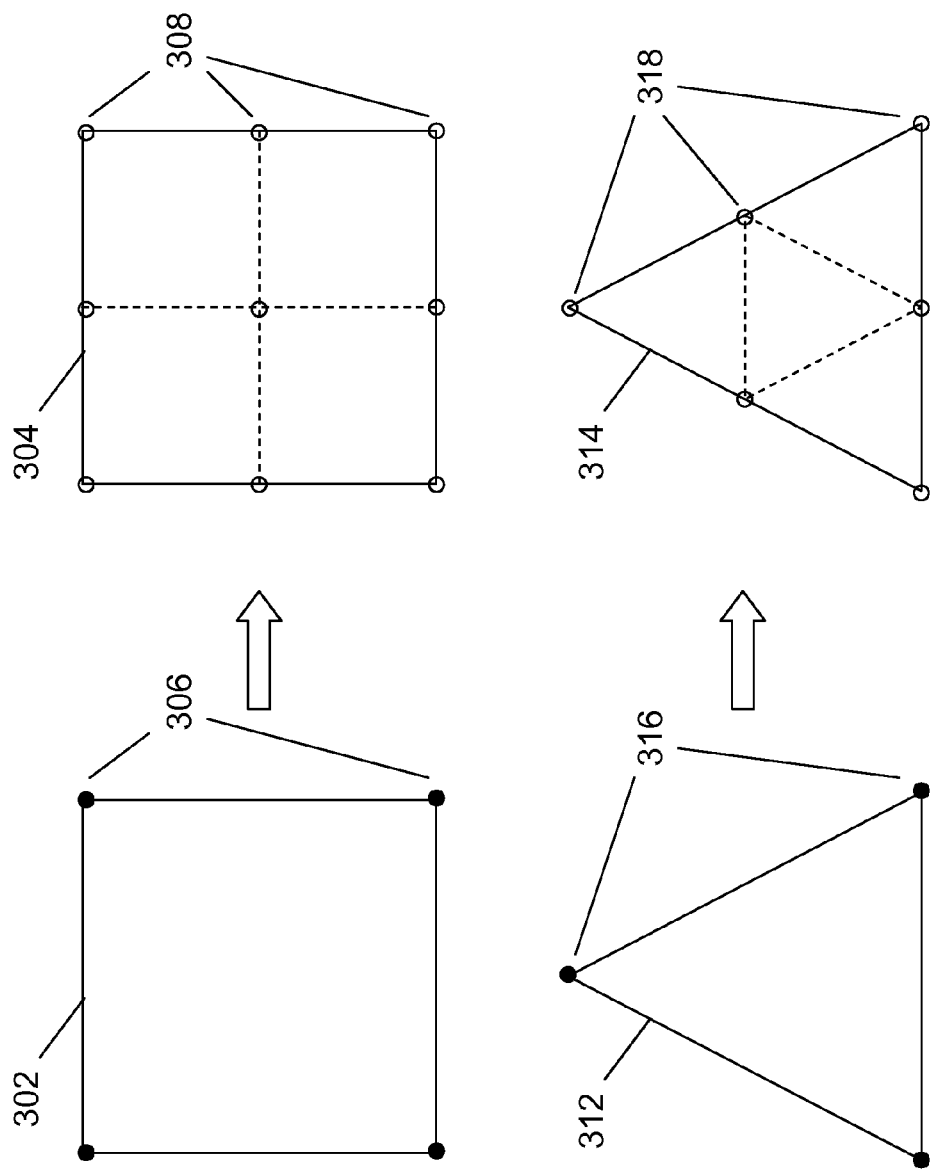
FIG. 3A shows exemplary old and new models in an adaptive process in accordance with one embodiment of the present invention.

Referring now to FIG. 3A, exemplary old and new models in an adaptive process are shown in accordance with one embodiment of the present invention. An old or first model 302 has a square background mesh with four nodes depicted as solid dots 306. After the adaptive process, the old model becomes a new or second model 304 with nine nodes shown as hollow circles 308. The single square background mesh is adapted to four smaller meshes. In another embodiment, an old or first model 312 has a triangular background mesh with three nodes (solid dots) 316. The old model 312 is adapted to a new or second model 314 with six nodes (hollow circles) 318 and four smaller triangular meshes. For illustration simplicity, only one element is shown in these two old models. The present invention can support unlimited number of elements in a mesh with arbitrary shape both in two dimensional and in three dimensional spaces. Also the nodal spacing can be randomly spaced to represent either any arbitrary shape of a domain or the deformed geometry of a domain.

Figure 3B:
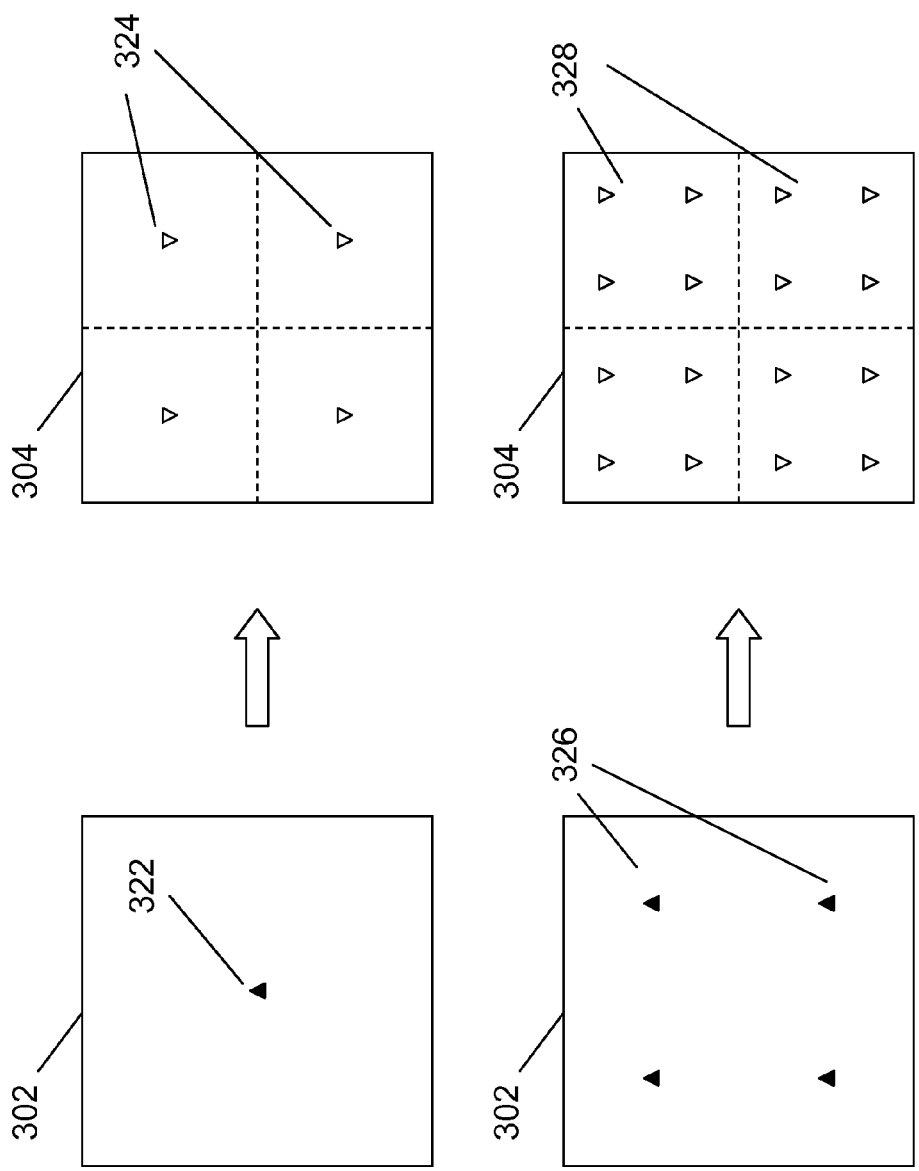
FIG. 3B show exemplary old and new integration points in two different embodiments of the old and new models of FIG. 3A.

FIG. 3B shows exemplary old and new integration points in two different embodiments of the old and new models of FIG. 3A. In the first embodiment, the old model 302 has one old integration point shown as solid triangle 322. The corresponding new model 304 has four new integration points shown as hollow triangles 324, one for each new adapted mesh. In the second embodiment, the old model 302 has four old integration points 326, while the new model 304 has 16 new integration points 328. It is note that the number of integration points is pre-determined for an analysis of a simulation.

Figure 3C:
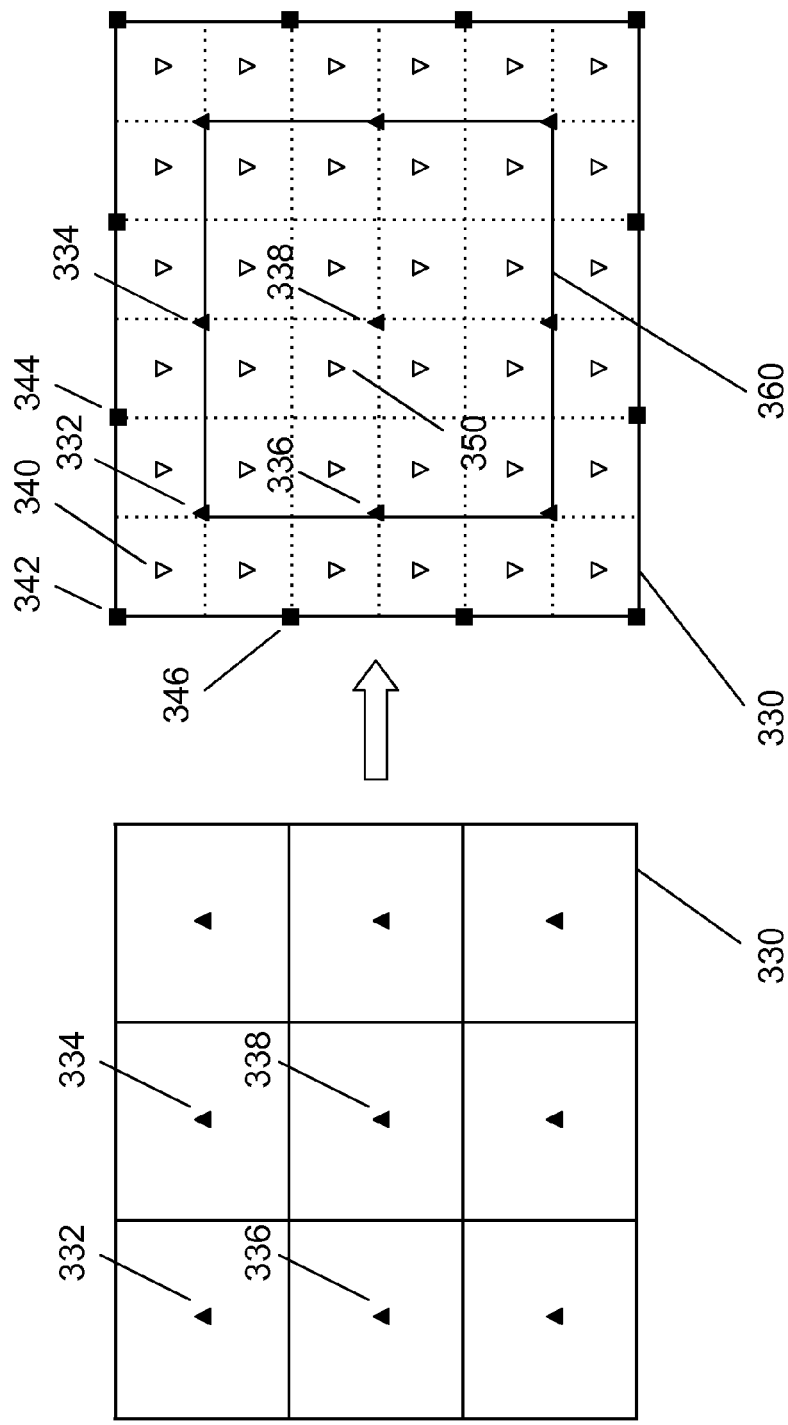
FIG. 3C shows an exemplary domain represented by a model in accordance with one embodiment of the present invention.

FIG. 3C shows an exemplary domain represented by a model in accordance with one embodiment of the present invention. A domain 330 is represented by the model with 16 nodes with a nine-element background mesh. Each of the nine elements has one old integration point (solid triangle 332, 334, 336, 338, etc.) The same domain 330 is shown with a plurality of new integration points (hollow triangles 340, 350) and a number of boundary nodes (solid squares 342, 344, 346, etc.) superimposed onto the background mesh with nine old integration points (solid triangles 332, 334, 336, 338, etc.). In the adaptive process, the state variables of the new integration points 340 and 350 are interpolated from those of the old integration points (e.g., 332, 334, 336, etc.) and old boundary nodes (e.g., node 342, 344, 346, etc.) using Equations (19) to (31). For a typical new integration point 350 located in the middle of the domain, the state variables can be interpolated using the old integration points alone, because only those old integration points that have influence over the new integration point being evaluated need to be included. In most cases, the typical new integration points are located inside an inner boundary 360, which is formed by connecting all of the new integration points at the outer perimeter. However, for those new integration points 340 located outside the inner boundary 360, the interpolation of the state variables is performed with both the old integration points and the boundary nodes. Without the inclusion of the old boundary points, the interpolation from the old integration points tends to result into a relative large numerical diffusion due to the new integration points are located outside of all of the old integration points as shown in FIG. 2B.

Figure 4:
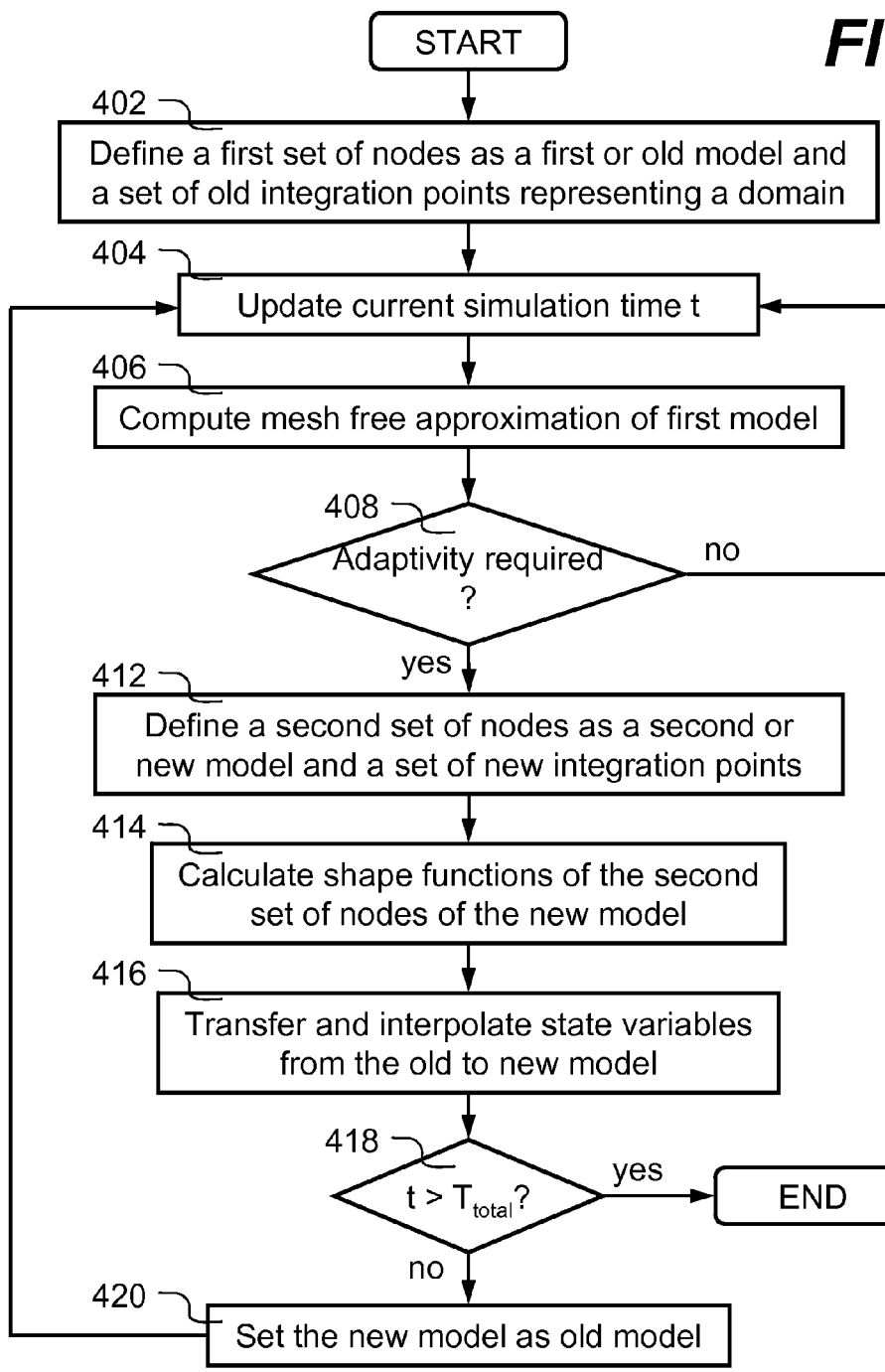
FIG. 4 shows a flowchart or process for a typical time history simulation of a domain using an adaptive mesh-free analysis in accordance with one embodiment of the present invention.

FIG. 4 shows a flowchart or process 400 for a typical time history simulation of a domain using an adaptive mesh-free analysis in accordance with one embodiment of the present invention. The process 400 starts by defining a first set of nodes as a first model (i.e., old model) to represent a domain (e.g., a structure, a vehicle, an airplane, a train) to be analyzed in a simulation at 402. The first model includes a background mesh (e.g., finite element mesh generated from a pre-processing module). The background mesh includes a plurality of elements (e.g., solids, shells, beams). Each of the elements has at least one integration point associated with it. The first model includes a set of old integration points in addition to the first set of nodes. After the first model is defined, the process 400 updating the current simulation time t. In one embodiment, the current simulation time is accumulated at each solution cycle by incrementing the time step Δt 404. Then the process 400 moves to 406 to perform a mesh-free approximation of the first model at the current simulation time using the mathematical formulas in Equations (1) to (15). Next, the process 400 checks if an adaptivity is required for the first model at the test 408. In one embodiment, the adaptivity is required basing on a pre-determined adaptive frequency (e.g., one adaptitity for every one millisecond). In another embodiment, the adaptivity is required basing on a pre-determined number of solution cycles (e.g., 1000 cycles). In yet another embodiment, the adaptivity is determined by the error indicator or error estimator. If the test 408 is false, which means the first or old model is still adequate to represent the domain. The process 400 follows the "no" branch back to 404 and updates the current solution time. And the simulation marches on to the new current simulation time until the test 408 becomes true. An adaptive process is embarked to create a new model representing the domain as the old model is not adequate any more. The process 400 follows the "yes" branch to 412, in which the process 400 defines a second set of nodes as a second or new model. Similar to the definition of the first model, a set of new integration points is defined accordingly. Next at 414, the process 400 calculates the new shape functions for the second set of nodes of the new model. Then at 416, the process 400 transfers and interpolates the state variables from the old model to the new model. In other words, the state variables at the new integration points of the new model are interpolated from the old integration points of the old model based on a specific process, which is described in FIG. 5 below. After the state variables are transferred, the process 400 checks whether the current simulation time has exceeded the predetermined total simulation time (e.g., 100 milliseconds) at 418. If the current simulation time has not reached the total simulation time, the process 400 follows the "no" branch to 420 by designating the new model as the old model. The process 400 moves back to 404 for another time update. And the process 400 repeats itself until the test 418 is true. That is when the process 400 ends.

FIG. 5 shows a flowchart or process 500 for transferring state variables between an old and a new model in an adaptive mesh-free analysis in accordance with one embodiment of the present invention. The process 500 starts by obtaining the values of state variables for all of the old boundary nodes of the first or old model at 502. In one embodiment, the state variables for the boundary nodes are obtained from the state variables of the old integration points. In another embodiment, the state variables for the boundary nodes are directly calculated. Next at 504, the process 500 defines a third set of nodes, which includes all of the old boundary nodes and all of the old integration points of the old model. At 506, the process 500 defines a support size for each of the nodes in the third set. In one embodiment, the support is a circle. In another embodiment, the support is a sphere. Then at 508, the process 500 associates a sub-set of nodes from the third set for each of the new integration points one at a time. The rule of this association is that the support of each of the nodes in the sub-set covers or influences over each of the new integration point to be evaluated. At 510, the process 500 constructs an interpolation shape function for the particular one of the new integration points based on the state variables of the associated sub-set of nodes in the third set. Because the number of the nodes in the sub-set is much smaller than the total number of nodes in the third set, the computational efficiency is achieved for calculating the interpolation shape function at each of the new integration points. The process 500 calculates the state variables at the particular one of the new integration points using the interpolation shape function at 512. Next at test 514, the process 500 determines whether there are more new integration nodes to be processed. If the test 514 is true, the process 500 follows the "yes" branch back to 508 to process another one of the new integration points. The process 500 repeats until no more new integration point thereby the test 514 is false and the process 500 returns.

Although an exemplary embodiment of invention has been disclosed, it will be apparent to those skilled in the art that various changes and modifications may be made to achieve the advantage of the invention. It will be obvious to those skilled in the art that some components may be substituted with another component providing same function. The appended claims cover the present invention.

What is claimed is:

1. A method for simulating a domain using adaptive mesh-free analysis with consistent state variables transfer, the method comprising:
    (a) defining a first set of nodes as an old model representing the domain, wherein the first set of nodes includes a group of boundary nodes;
    (b) updating current solution time;
    (c) performing mesh-free approximation of the first set of nodes at the current solution time;

(d) when adaptivity is required, defining a second set of nodes as a new model representing the domain, wherein the second set of nodes are adapted from the first set of nodes;

(e) transferring old state variables of the old model to new state variables of the new model; and (f) when the current solution time is less than a predefined total simulation time, setting the new model as the old model and repeating (b) to (f).

2. The method of claim 1, wherein the domain is one of a structure, a vehicle, an airplane and a train.

3. The method of claim 1, wherein the boundary nodes are located at boundary of the domain.

4. The method of claim 1, wherein the current simulation time is accumulated at each solution cycle.

5. The method of claim 1, wherein the old and new state variables include stress, strain, and internal variables that are required for subsequent simulation.

6. The method of claim 1, wherein the first model includes a plurality of old integration points and the second model includes a plurality of new integration points.

7. The method of claim 6, said transferring the old state variables further comprising:
  defining a third set of nodes that includes certain of the boundary nodes and the old integration points;
  for each of the new integration points, defining a sub-set of nodes from the third set;
  constructing a local interpolant at the each of the new integration points based on the old state variables of the sub-set of nodes; and
  calculating the new state variables of the each of the new integration points using the local interpolant.

8. The method of claim 7, further comprising calculating the old state variables of each of the boundary nodes from the old state variables of the old integration points or directly calculated.

9. The method of claim 7, further comprising defining a support for each of the sub-set of nodes.

10. The method of claim 9, wherein the support is an area in two-dimension or a volume in three-dimension.

11. The method of claim 10, wherein the area is one of a circle, a square, a triangle, a rectangle, and a polygon.

12. The method of claim 10, wherein the volume is one of a sphere, a tetrahedron, a cube, and a hexahedron.

13. The method of claim 10, wherein the support of each of the sub-set of nodes covers the each of the new integration points.

14. The method of claim 7, wherein number of the sub-set of nodes is smaller than that of the third set.

15. A computer memory having a computer readable medium stored thereon to perform a method for simulating a domain using adaptive mesh-free analysis with consistent state variables transfer, the computer readable medium product comprising:
  computer readable code for defining a first set of nodes as an old model representing the domain, wherein the first set of nodes includes a group of boundary nodes;
  computer readable code for updating current solution time;
  computer readable code for performing mesh-free approximation of the first set of nodes at the current solution time;
  when adaptivity is required, computer readable code for defining a second set of nodes as a new model representing the domain, wherein the second set of nodes are adapted from the first set of nodes;
  computer readable code for transferring old state variables of the old model to new state variables of the new model; and
  when the current solution time is less than a predefined total simulation time, computer readable code for setting the new model as the old model.

16. The computer readable medium of claim 15, wherein the first model includes a plurality of old integration points and the second model includes a plurality of new integration points.

17. The computer readable medium of claim 16, the computer readable code for transferring the old state variables further comprising:
  computer readable code for defining a third set of nodes that includes certain of the boundary nodes and the old integration points;
  for each of the new integration points, computer readable code for defining a sub-set of nodes from the third set;
  computer readable code for constructing a local interpolant at the each of the new integration points based on the old state variables of the sub-set of nodes; and
  computer readable code for calculating the new state variables of the each of the new integration points using the local interpolant.

18. A system for simulating a domain using adaptive mesh-free analysis with consistent state variables transfer, the system comprising:
  an I/O interface;
  a communication interface;
  a secondary memory;
  a main memory for storing computer readable code for an application module;
  at least one processor coupled to the main memory, the secondary memory, the I/O interface, and the communication interface, said at least one processor executing the computer readable code in the main memory to cause the application module to perform operations of:
    (a) defining a first set of nodes as an old model representing the domain, wherein the first set of nodes includes a group of boundary nodes;
    (b) updating current solution time;
    (c) performing mesh-free approximation of the first set of nodes at the current solution time;
    (d) when adaptivity is required, defining a second set of nodes as a new model representing the domain, wherein the second set of nodes are adapted from the first set of nodes;
    (e) transferring old state variables of the old model to new state variables of the new model; and
    (f) when the current solution time is less than a predefined total simulation time, setting the new model as the old model and repeating (b) to (f).

19. The system of claim 18, wherein the first model includes a plurality of old integration points and the second model includes a plurality of new integration points.

20. The system of claim 19, said transferring the old state variables further comprising operations of:
  defining a third set of nodes that includes certain of the boundary nodes and the old integration points;
  for each of the new integration points, defining a sub-set of nodes from the third set;
  constructing a local interpolant at the each of the new integration points based on the old state variables of the sub-set of nodes; and
  calculating the new state variables of the each of the new integration points using the local interpolant.

* * * * *